US012196651B2

United States Patent
Han

(10) Patent No.: US 12,196,651 B2
(45) Date of Patent: Jan. 14, 2025

(54) METHOD FOR MEASURING DISTRIBUTION OF PORES IN ELECTRODE FOR SECONDARY BATTERY

(71) Applicant: LG Chem, Ltd., Seoul (KR)

(72) Inventor: Jung Hoon Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1453 days.

(21) Appl. No.: 16/607,526

(22) PCT Filed: May 29, 2018

(86) PCT No.: PCT/KR2018/006076
§ 371 (c)(1),
(2) Date: Oct. 23, 2019

(87) PCT Pub. No.: WO2018/221929
PCT Pub. Date: Dec. 6, 2018

(65) Prior Publication Data
US 2020/0141841 A1     May 7, 2020

(30) Foreign Application Priority Data
May 29, 2017   (KR) .......................... 10-2017-0065845

(51) Int. Cl.
G01N 15/08   (2006.01)
G01N 1/30    (2006.01)
G01N 23/207  (2018.01)
G01N 23/223  (2006.01)
(Continued)

(52) U.S. Cl.
CPC ............... *G01N 1/30* (2013.01); *G01N 15/08* (2013.01); *G01N 23/2076* (2013.01); *G01N 23/223* (2013.01); *G01N 23/2252* (2013.01); *H01B 1/04* (2013.01); *H01M 4/13* (2013.01); *H01M 4/621* (2013.01); *G01N 2223/079* (2013.01); *G01N 2223/402* (2013.01); *G01N 2223/409* (2013.01); *G01N 2223/649* (2013.01)

(58) Field of Classification Search
None
See application file for complete search history.

(56) References Cited

U.S. PATENT DOCUMENTS

| 2008/0226984 | A1  | 9/2008 | Lee et al. |
| 2013/0017434 | A1* | 1/2013 | Shimizu ............... H01M 4/13 |
| | | | 429/211 |

(Continued)

FOREIGN PATENT DOCUMENTS

| CN | 102735599 B   | 12/2016 |
| JP | 2000171420 A  | 6/2000  |

(Continued)

OTHER PUBLICATIONS

Ender et al. 'Three-dimensional reconstruction of a composite cathode for lithium-ion cells' Electrochemistry Communications vol. 13, Issue 2, Feb. 2011, pp. 166-168 (Year: 2011).*

(Continued)

*Primary Examiner* — Eliza W Osenbaugh-Stewart
(74) *Attorney, Agent, or Firm* — Lerner David LLP

(57) ABSTRACT

The present invention provides a method for measuring a distribution of pores in an electrode for a secondary battery, which can easily measure a distribution of pores inside the electrode for a secondary battery.

8 Claims, 8 Drawing Sheets

(51) Int. Cl.
  *G01N 23/2252*  (2018.01)
  *H01B 1/04*  (2006.01)
  *H01M 4/13*  (2010.01)
  *H01M 4/62*  (2006.01)

(56) References Cited

U.S. PATENT DOCUMENTS

| | | | |
|---|---|---|---|
| 2014/0038043 A1 | 2/2014 | Hirayama et al. | |
| 2015/0024302 A1* | 1/2015 | Kobayashi | B32B 18/00 |
| | | | 429/489 |

FOREIGN PATENT DOCUMENTS

| | | | |
|---|---|---|---|
| JP | 2003139728 | A | 5/2003 |
| JP | 2003279508 | A | 10/2003 |
| KR | 20070011543 | A | 1/2007 |
| KR | 100766967 | B | 10/2007 |
| KR | 20150050168 | A | 5/2015 |
| KR | 20170006663 | A | 1/2017 |
| KR | 20170019146 | A | 2/2017 |
| WO | 2012137703 | A1 | 10/2012 |
| WO | 2013003846 | A2 | 1/2013 |
| WO | 2017031006 | A1 | 2/2017 |

OTHER PUBLICATIONS

Extended European Search Report with Written Opinion for Application No. 18809590.5 dated May 27, 2020, 6 pages.
International Search Report from Application No. PCT/KR2018/006076 mailed Aug. 31, 2018.

* cited by examiner

[Figure 1]
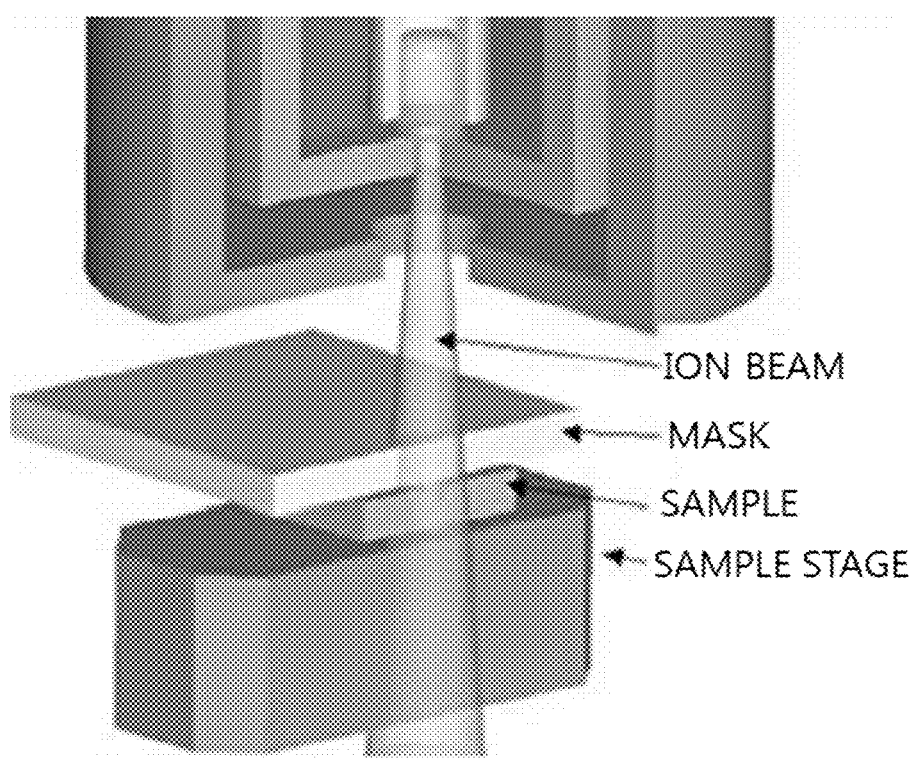

[Figure 2A]
NEGATIVE ELECTRODE 1:
UPPER PORTION HAVING SIMILAR POROSITY
NEGATIVE ELECTRODE 2:
UPPER PORTION HAVING HIGH POROSITY AND LOWER PORTION HAVING LOW POROSITY
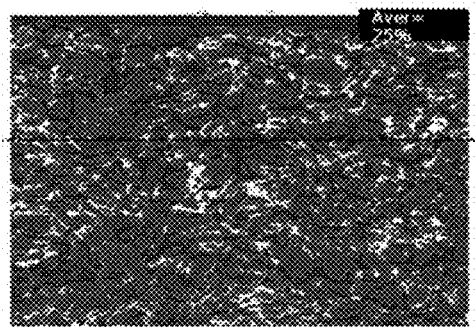
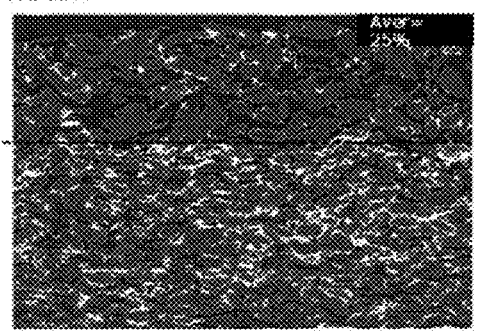
[Figure 2B]
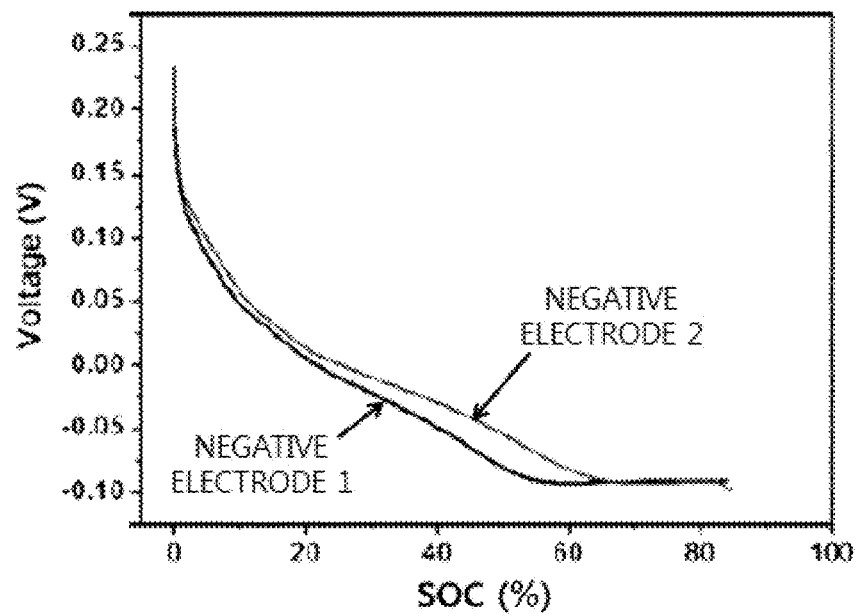

[Figure 3A]
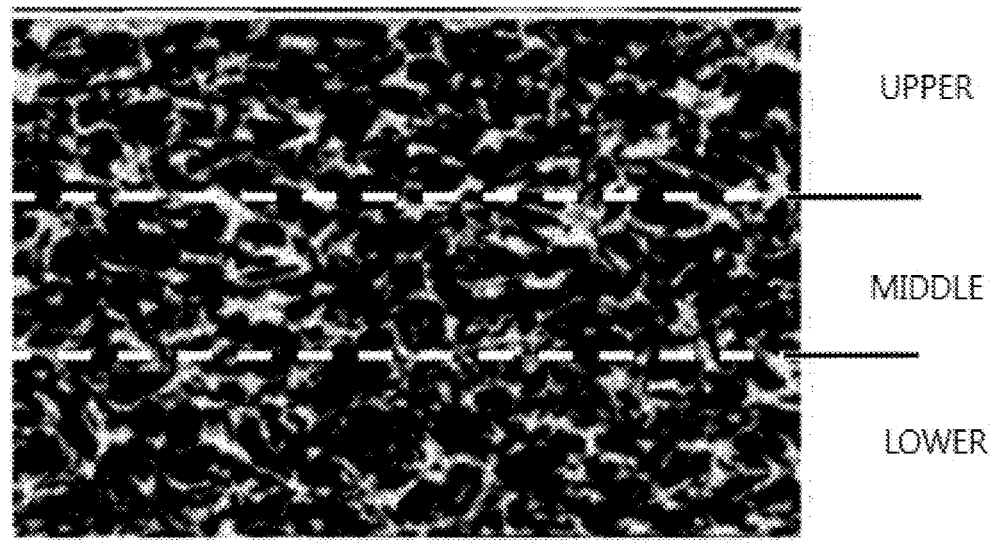
[Figure 3B]
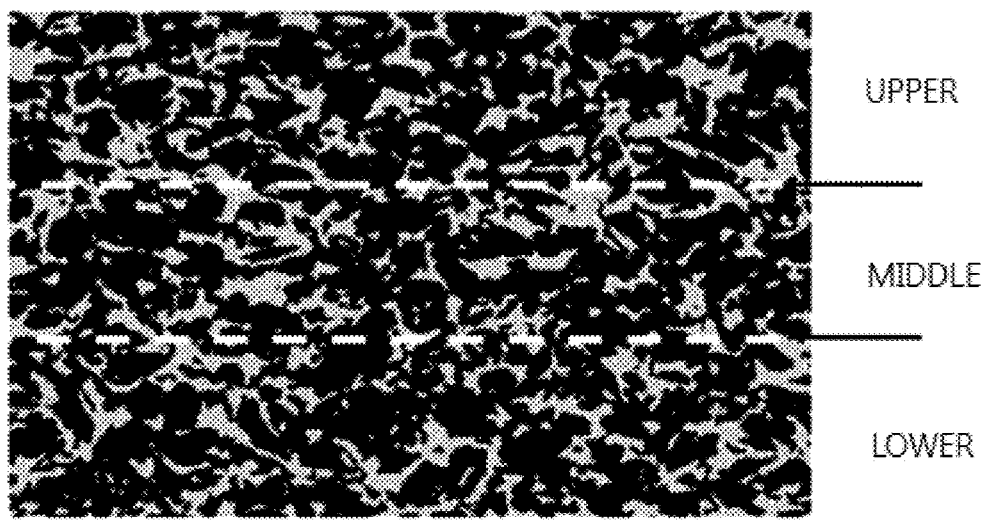

[Figure 4A]
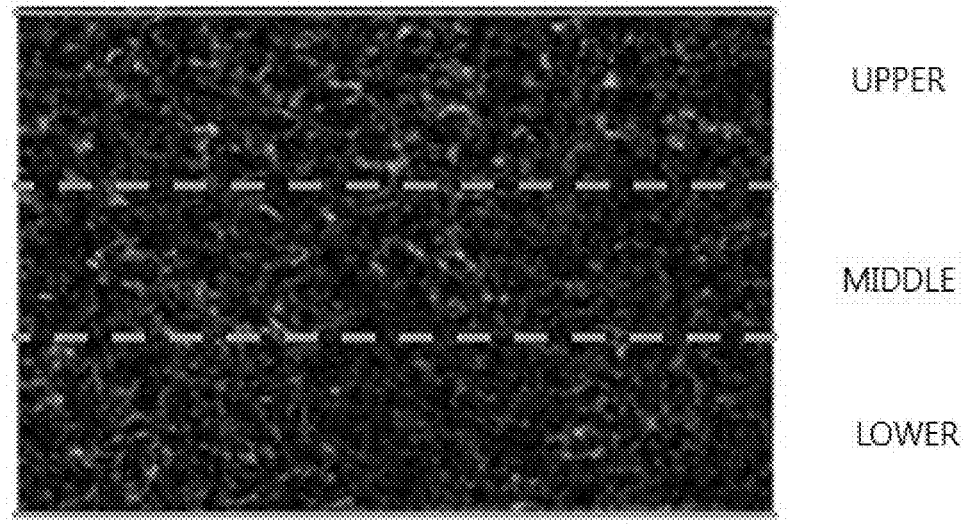
[Figure 4B]
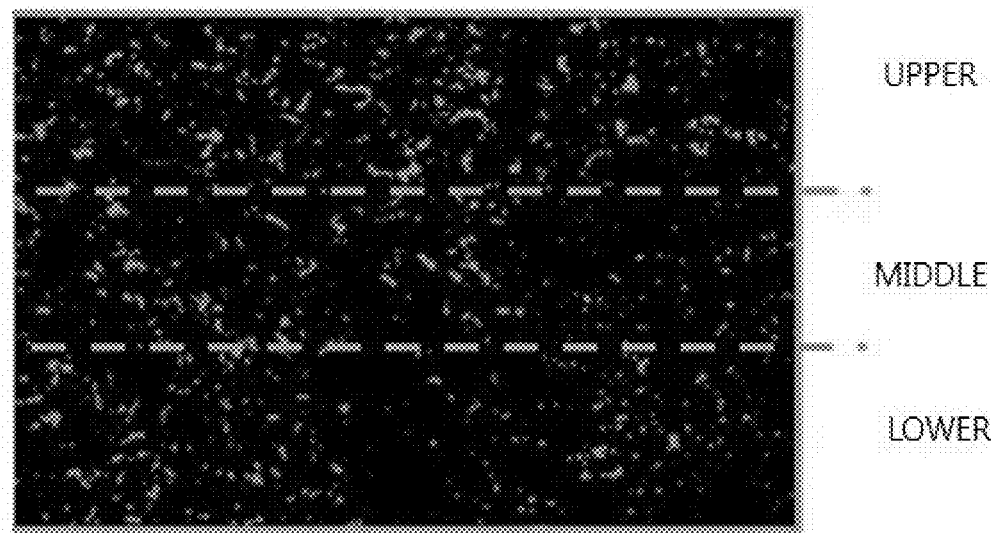

[Figure 5A]
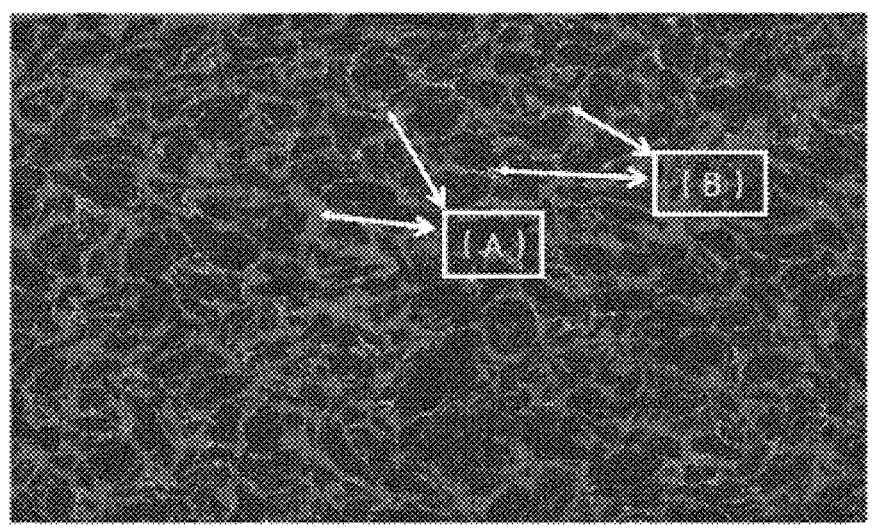
( A ) : PORE
( B ) : BINDER
[Figure 5B]
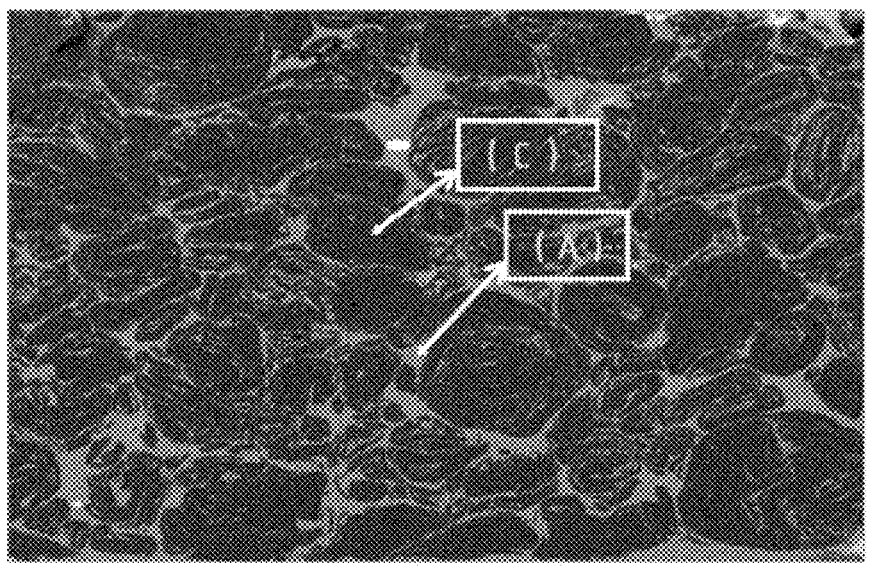
( A ) : PORE
( C ) : ACTIVE MATERIAL

[Figure 5C]
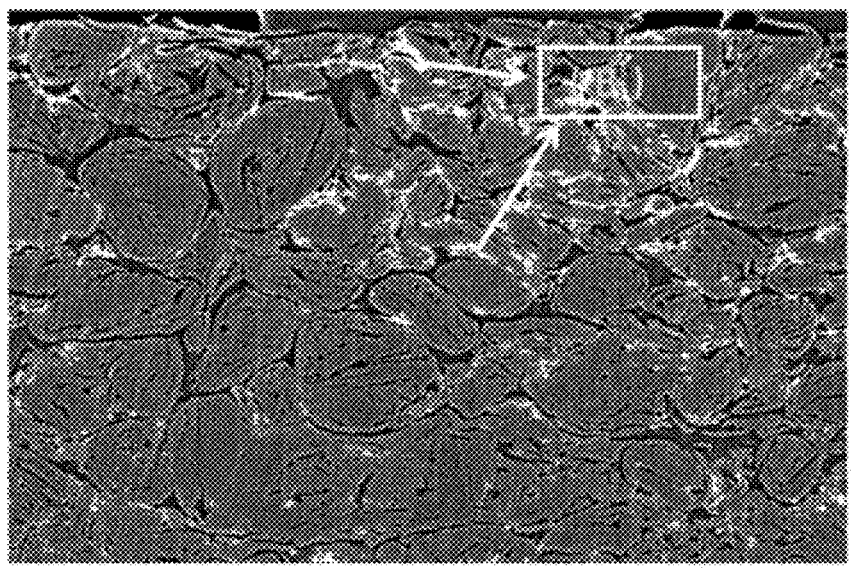
(B): BINDER
[Figure 5D]
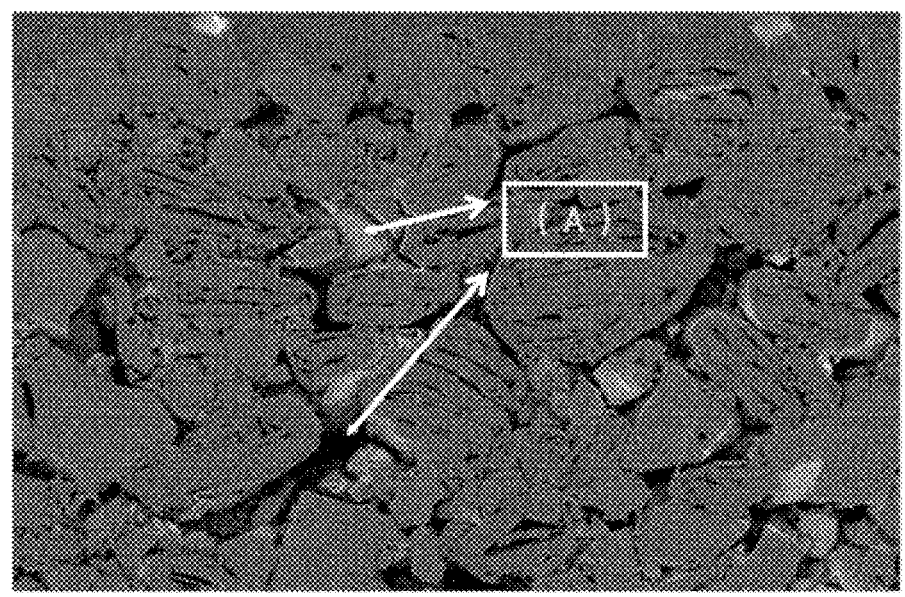
(A): REGION WHICH IS PORE BUT OBSERVED AS ACTIVE MATERIAL

[Figure 5E]
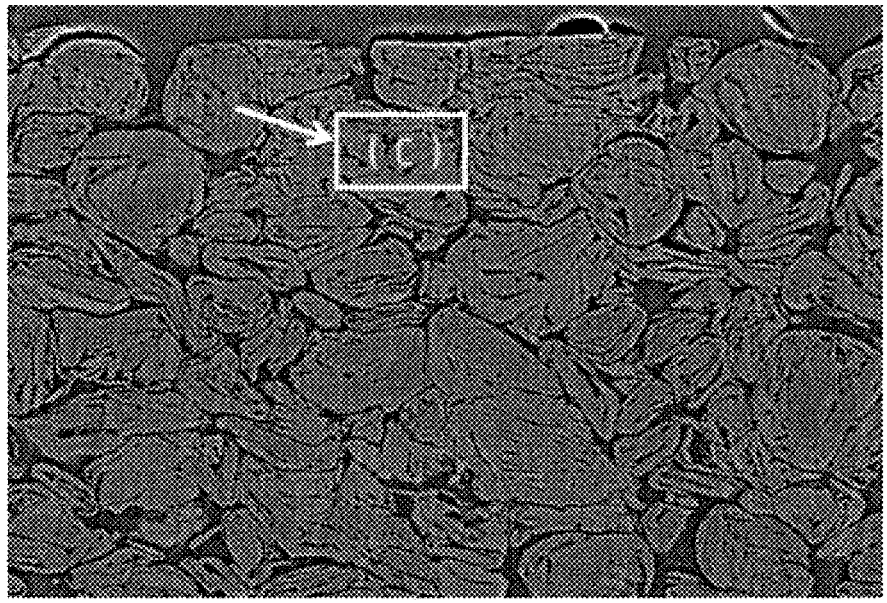
( C ) : ACTIVE MATERIAL

[Figure 6A]
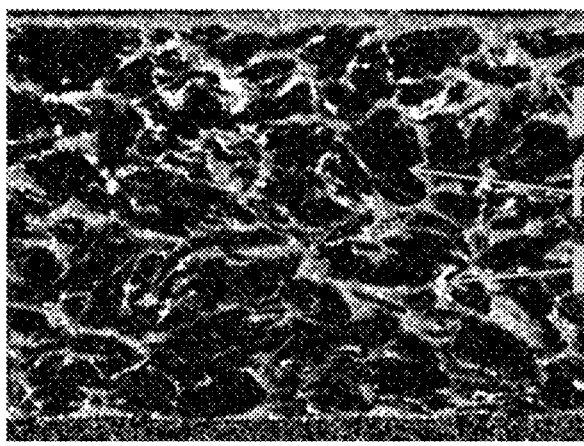 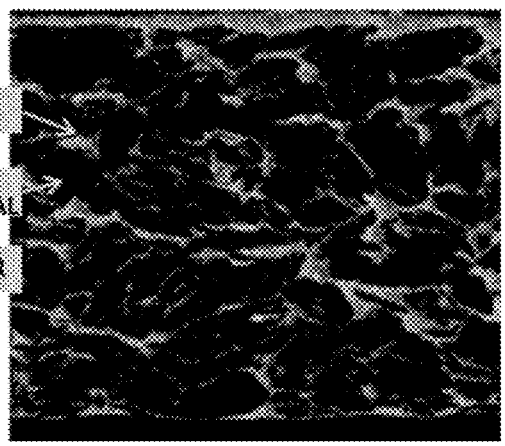
[Figure 6B]
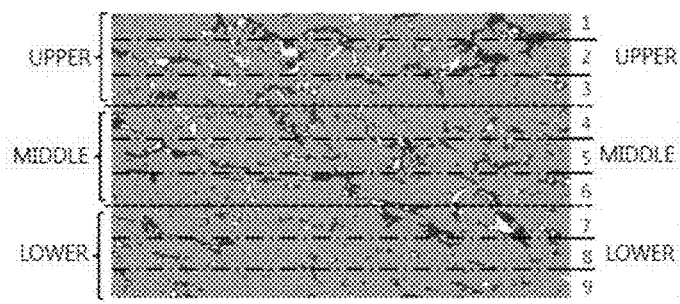 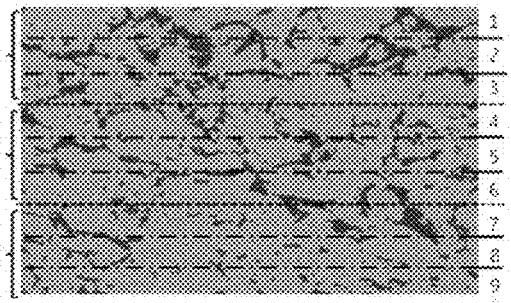

METHOD FOR MEASURING DISTRIBUTION OF PORES IN ELECTRODE FOR SECONDARY BATTERY

CROSS-REFERENCE TO RELATED APPLICATIONS

The present application is a national phase entry under 35 U.S.C. § 371 of International Appication No. PCT/KR2018/006076, filed May 29, 2018, which claims priority from Korean Patent Application No. 10-2017-0065845, filed May 29, 2017, the disclosures of which are incorporated herein by reference in their entirety.

TECHNICAL FIELD

The present invention relates to a method for measuring a distribution of pores in an electrode for a secondary battery, which can easily measure a distribution of pores inside the electrode for a secondary battery.

BACKGROUND ART

A secondary battery is largely composed of electrodes, a separator, and an electrolytic solution, and the electrodes are classified into a negative electrode and a positive electrode. Since constituent materials such as an active material, a conductive material, and a binder are three-dimensionally distributed in the electrodes, a plurality of pores is present in gaps therebetween. The pores present in the electrodes are filled with an electrolytic solution in the secondary battery, and thus become channels for ions, and the like. Accordingly, since the size, number, distribution, and the like of pores affect the diffusivity of ions and significantly affect the performance of a secondary battery, it is important to exactly analyze the distribution of pores inside the electrode.

However, it was difficult to observe the distribution of pores on the cross-section of the electrode in the related art, and since a scanning electron microscope (SEM) has a deep focal depth, signals from constituent materials inside the electrode, which are present on different focal planes at the bottom of the pore, are simultaneously detected, and as a result, there is a problem in that the actual pores are expressed as constituent materials inside the electrode on a scanning electron microscope image, thereby making it impossible to exactly analyzing the distribution of pores inside the electrode.

Therefore, there is a need for a method which can clearly distinguish constituent materials and pores inside the electrode from each other and simultaneously analyze the distribution of pores inside the electrode.

REFERENCES OF THE RELATED ART

Patent Document (Patent Document 1) Korean Patent Application Laid-Open No. 2014-0132956

SUMMARY OF THE INVENTION

The present invention has been made in an effort to provide a method for measuring a distribution of pores in an electrode for a secondary battery, which can easily analyze a distribution of pores inside the electrode by clearly distinguishing the constituent materials and pores inside the electrode from each other.

However, a problem to be solved by the present invention is not limited to the aforementioned problem, and the other problems that are not mentioned may be clearly understood by a person skilled in the art from the following description.

An exemplary embodiment of the present invention provides a method for measuring a distribution of pores in an electrode for a secondary battery, the method including: preparing an electrode for a secondary battery including an electrode active material, a binder, and a conductive material; filling pores inside the electrode for a secondary battery with a polymer including silicon by impregnating the polymer including silicon into the electrode for a secondary battery; producing an electrode cross-sectional sample by irradiating the electrode for a secondary battery with an ion beam of an ion milling device; detecting silicon present on the electrode cross-sectional sample by using an energy-dispersive X-ray spectroscopy; and confirming a distribution of pores by analyzing an image in which points of silicon detected by the energy-dispersive X-ray spectroscopy are mapped.

A method for measuring a distribution of pores in an electrode for a secondary battery according to an exemplary embodiment of the present invention can confirm a distribution of pores inside the electrode by clearly distinguishing the constituent materials of the electrode from each other, thereby exactly predicting the performance of the electrode for a secondary battery.

According to an exemplary embodiment of the present invention, pores in the electrode can be more exactly distinguished by staining a binder.

The effects of the present invention are not limited to the above-described effects, and effects, which are not mentioned, will be clearly understood by a person skilled in the art from the specification of the present application and the accompanying drawings.

BRIEF DESCRIPTION OF THE DRAWINGS

FIG. 1 is a view illustrating an ion milling device used in the producing of the electrode cross-sectional sample according to an exemplary embodiment of the present invention.

FIG. 2A is a set of views illustrating cross-sections of two negative electrodes for a secondary battery, and FIG. 2B is a graph illustrating charge characteristics of the two negative electrodes for a secondary battery.

FIG. 3A is a view illustrating an EDS mapping image for pores of a negative electrode cross-sectional sample obtained by using an energy-dispersive X-ray spectroscopy (EDS) according to an exemplary embodiment of the present invention, and FIG. 3B is a view illustrating an image extracted by applying the EDS mapping image for the pores of the negative electrode cross-sectional sample to image processing.

FIG. 4A is a view illustrating an EDS mapping image for a binder of the negative electrode cross-sectional sample obtained by using the EDS according to an exemplary embodiment of the present invention, and FIG. 4B is a view illustrating an image extracted by applying the EDS mapping image for the binder of the negative electrode cross-sectional sample to image processing.

FIG. 5A is a scanning electron microscope (SEM) photograph of a negative electrode cross-sectional sample produced in Example 1, FIG. 5B is a SEM photograph of a negative electrode cross-sectional sample produced in Example 2, FIG. 5C is a SEM photograph of a negative electrode cross-sectional sample produced in Comparative Example 1, FIG. 5D is a SEM photograph of a negative electrode cross-sectional sample produced in Comparative Example 2, and FIG. 5E is a SEM photograph of a negative electrode cross-sectional sample produced in Comparative Example 3.

FIG. 6A is a set of views illustrating EDS mapping images of the negative electrode cross-sectional samples according to Examples 1 and 2 of the present invention obtained by using the EDS, and FIG. 6B illustrates images extracted by applying the EDS mapping images for the negative electrode cross-sectional samples according to Examples 1 and 2 to image processing.

DETAILED DESCRIPTION

When one part "includes" one constituent element throughout the specification of the present application, unless otherwise specifically described, this does not mean that another constituent element is excluded, but means that another constituent element may be further included.

Throughout the specification of the present application, when one member is disposed "on" another member, this includes not only a case where the one member is brought into contact with another member, but also a case where still another member is present between the two members.

Hereinafter, the present specification will be described in more detail.

An exemplary embodiment of the present invention provides a method for measuring a distribution of pores in an electrode for a secondary battery, the method including: preparing an electrode for a secondary battery including an electrode active material, a binder, and a conductive material; filling pores inside the electrode for a secondary battery with a polymer including silicon by impregnating the polymer including silicon into the electrode for a secondary battery; producing an electrode cross-sectional sample by irradiating the electrode for a secondary battery with an ion beam of an ion milling device; detecting silicon present on the electrode cross-sectional sample by using an energy-dispersive X-ray spectroscopy; and confirming a distribution of pores by analyzing an image in which points of silicon detected by the energy-dispersive X-ray spectroscopy are mapped.

A method for measuring a distribution of pores in an electrode for a secondary battery according to an exemplary embodiment of the present invention can confirm a distribution of pores inside the electrode by clearly distinguishing the constituent materials and pores of the electrode from each other, thereby exactly predicting the performance of the electrode for a secondary battery.

According to an exemplary embodiment of the present invention, the electrode for a secondary battery includes an electrode active material, a binder, and a conductive material. Further, the electrode of a secondary battery may further include various additives capable of improving the performance thereof. The electrode active material, the binder, the conductive material, and the like are three-dimensionally distributed in an electrode for a secondary battery, and a plurality of pores may be present in gaps therebetween. That is, electrode constituent materials such as an electrode active material, a binder, and a conductive material and a plurality of pores may constitute the electrode for a secondary battery.

As the electrode active material, the binder, the conductive material, and the like, which are included in the electrode for a secondary battery, materials typically used in the art may be adopted and used without any particular limitation. Specifically, when the electrode for a secondary battery is a negative electrode, it is possible to use, as the binder, carboxymethyl cellulose (CMC), a diene-based binder such as butadiene, an acrylic binder, and the like. Furthermore, as the negative electrode active material, it is possible to use a carbon-based material in various forms, including artificial graphite, natural graphite, or hard carbon capable of intercalating and deintercalating lithium, a non-carbon-based material including silicon (Si), lithium titanium oxide (LTO), and the like.

According to an exemplary embodiment of the present invention, the filling of pores inside the electrode for a secondary battery with the polymer including silicon may be penetrating the polymer including silicon into the electrode for a secondary battery by impregnating the polymer including silicon into the electrode for a secondary battery. As the polymer including silicon, a liquid-phase polymer may be used. By using a liquid-phase polymer including silicon, it is possible to more effectively fill pores of the electrode for a secondary battery with the polymer including silicon. A method of impregnating the polymer including silicon into the pores of the electrode for a secondary battery may be carried out by a typical method in the art. For example, the polymer including silicon may be impregnated into the pores of the electrode for a secondary battery by a method of applying the polymer including silicon onto the electrode for a secondary battery, immersing the electrode for a secondary battery into a polymer solution including silicon, or the like.

FIG. 1 is a view illustrating an ion milling device used in the producing of the electrode cross-sectional sample according to an exemplary embodiment of the present invention. Referring to FIG. 1, a focused ion beam produced from an ion gun may pass through a mask, and then the surface of the sample may be irradiated with the focused ion beam.

According to an exemplary embodiment of the present invention, electrode materials may be sputtered by irradiating the electrode for a secondary battery with an ion beam produced from an ion gun of an ion milling device. Accordingly, it is possible to produce an electrode cross-sectional sample having a clean cross section which is not physically damaged. As the electrode cross-sectional sample has a clean cross section which is not physically damaged, the pores of the electrode for a secondary battery can be more precisely analyzed.

According to an exemplary embodiment of the present invention, the ion beam may be an argon ion beam. The electrode cross-sectional sample may be more stably produced by irradiating the electrode for a secondary battery with an argon ion beam.

According to an exemplary embodiment of the present invention, an ion beam current of the ion milling device may be 100 μA or more and 250 μA or less. Specifically, the ion beam current of the ion milling device may be 110 μA or more and 150 μA or less, or 200 μA or more and 230 μA or less. By adjusting the ion beam current of the ion milling device to the above-described range, it is possible to shorten the time taken to produce the electrode cross-sectional sample and to prevent a phenomenon in which electrode materials are redeposited onto the cross section of the sample, thereby producing an electrode cross-sectional sample having a cleaner cross section. Accordingly, it is possible to increase the efficiency of analyzing pores inside the electrode for a secondary battery.

According to an exemplary embodiment of the present invention, a discharge current of the ion milling device may be 250 μA or more and 450 μA or less. Specifically, the discharge current of the ion milling device may be 370 μA or more and 450 μA or less, or 400 μA or more and 430 μA or less. By adjusting the discharge current of the ion milling device to the above-described range, it is possible to prevent the operation efficiency of the ion milling device from being decreased and to minimize the time taken to produce the electrode cross-sectional sample.

According to an exemplary embodiment of the present invention, in the detecting of silicon present in the electrode cross-sectional sample, a point where silicon is present in the electrode cross-sectional sample can be grasped by using the energy-dispersive X-ray spectroscopy. Specifically, the pores of the electrode for a secondary battery are filled with the polymer including silicon, and it is possible to detect silicon included in the polymer filling the pores by using the energy-dispersive X-ray spectroscopy. Accordingly, it is possible to grasp a point where pores are located in the electrode for a secondary battery, and the size, number, distribution, and the like of the pores.

Since pores formed in gaps among the materials constituting the electrode may become channels for ions, and the like, the size, number, distribution, and the like of the pores present in the electrode may significantly affect the secondary battery performance.

FIG. 2A is a set of views of cross-sections of two negative electrodes for a secondary battery, and FIG. 2B is a graph illustrating charge characteristics of the two negative electrodes for a secondary battery. Specifically, FIG. 2A illustrates the cross sections of the two negative electrodes for a secondary battery, which have the same distribution of total pores, but the different distributions of pores at the upper portion and lower portion on the cross-section of each of the negative electrodes for a secondary battery.

Negative Electrode 1 and Negative Electrode 2 have the same distribution of total pores of 25% on the same area. However, referring to FIG. 2A, in the case of Negative Electrode 1, the pores having similar sizes are uniformly distributed at the upper portion and the lower portion on the cross section of the negative electrode. In contrast, in the case of Negative Electrode 2, the pores present at the upper portion on the cross section of the negative electrode are larger than those present at the lower portion, and a larger number of pores are present at the upper portion than at the lower portion. FIG. 2B is a graph illustrating charge characteristics (state of charge; SOC) according to the voltage applied to Negative Electrode 1 and Negative Electrode 2. Referring to FIG. 2B, it can be seen that Negative Electrode 2, in which the pores present at the upper portion on the cross section of the negative electrode are larger than those at the lower portion and a larger number of pores are present at the upper portion than at the lower portion, has better charge characteristics than those of Negative Electrode 1, in which the pores having similar sizes are uniformly distributed at the upper portion and the lower portion on the cross section of the negative electrode.

Accordingly, when the size, number, distribution, and the like of pores inside the electrode are exactly analyzed, it is possible to more effectively predict the performance of an electrode for a secondary battery and a secondary battery including the same.

In the related art, a scanning electron microscope (SEM) was used in order to analyze the size, number, distribution, and the like of pores present in an electrode for a secondary battery. However, since the scanning electron microscope (SEM) has a deep focal depth, there is a problem in that signals from an electrode active material, a binder, and the like of an electrode for a secondary battery, which are present on different focal planes at the bottom of the pore, are simultaneously detected. Thus, the pores are expressed, in spite of the pores present in an electrode for a secondary battery, as constituent materials of the electrode for a secondary battery on an image produced by a scanning electron microscope, thereby making it impossible to exactly analyze the pores present in the electrode for a secondary battery.

In contrast, according to an exemplary embodiment of the present invention, by filling the pores of the electrode for a secondary battery with a polymer including silicon and detecting silicon present in the electrode cross-sectional sample produced from the electrode for a secondary battery, the constituent materials and pores of the electrode for a secondary battery can be clearly distinguished from each other, and the size, number, distribution, and the like of the pores can be easily confirmed.

Specifically, by filling the pores of the electrode for a secondary battery with the polymer including silicon, it is possible to prevent a phenomenon of simultaneously detecting signals from the constituent materials of the electrode for a secondary battery, which may be generated as the constituent materials of the electrode for a secondary battery are present on the different focal planes at the bottom of the pore. Accordingly, even when an electrode cross-sectional sample in which the pores of the electrode for a secondary battery are filled with the polymer including silicon is observed with a scanning electron microscope, it is possible to distinguish the pores from the constituent materials of the electrode for a secondary battery. Further, silicon of the polymer filling the pores of the electrode for a secondary battery is detected by using an energy-dispersive X-ray spectroscopy, thereby clearly distinguishing the constituent materials and pores of the electrode for a secondary battery from each other to easily analyze the size, number, distribution, and the like of the pores.

Accordingly, according to an exemplary embodiment of the present invention, by clearly distinguishing the constituent materials and pores of the electrode for a secondary battery from each other, the pores can be exactly analyzed and the distribution of the pores can be confirmed, thereby more effectively predicting the performance of the electrode for a secondary battery and a secondary battery including the same.

According to an exemplary embodiment of the present invention, the polymer including silicon may include one or more selected from the group consisting of polydimethylsiloxane, polysiloxane, polysilane, and polysilazane. Silicon may be included in a repeat unit of the polymer including silicon. A silicon component included in the polymer may maximize the contrast effect caused by the difference in atomic number, thereby clearly distinguishing the pores and constituent materials of the electrode for a secondary battery from each other.

According to an exemplary embodiment of the present invention, it is possible to confirm the distribution, size, number, position, and the like of pores present in the electrode for a secondary battery by analyzing an image in which the points of silicon detected by the energy-dispersive X-ray spectroscopy are mapped.

As the energy-dispersive X-ray spectroscopy (EDS), one attached to a scanning electron microscope may be used. The energy-dispersive X-ray spectroscopy is an analyzing apparatus of measuring components of a sample by detecting X-ray generated when the surface of the sample is irradiated with an electron beam, and has advantages in that the apparatus is simply operated and can simultaneously detect energies of all the elements included in the sample.

According to an exemplary embodiment of the present invention, as the energy-dispersive X-ray spectroscopy, it is possible to use an apparatus having an energy resolution of 5.9 keV or more and 136 keV or less and a minimum detection limit of 0.1 wt %. By using an energy-dispersive X-ray spectroscopy having the conditions, it is possible to more exactly detect silicon of the polymer filling the pores of the electrode for a secondary battery.

According to an exemplary embodiment of the present invention, by using the energy-dispersive X-ray spectroscopy, it is possible to detect silicon of the polymer filling the pores of the electrode for a secondary battery and to extract an EDS mapping image in which the positions of the detected silicon are marked. Through the image in which the positions of silicon are mapped, it is possible to confirm the position, shape, size, number, distribution, and the like of the pores of the electrode for a secondary battery.

According to an exemplary embodiment of the present invention, the confirming of the distribution of pores may include quantitatively analyzing the distribution of pores of the electrode for a secondary battery. Specifically, the distribution of pores at each portion of the electrode for a secondary battery can be quantitatively analyzed by applying an EDS mapping image extracted by the energy-dispersive X-ray spectroscopy to image processing. For example, by converting the EDS mapping image into black and white through the image processing and using the difference in brightness at each portion in the EDS mapping image converted into black and white, it is possible to effectively distinguish the pores and electrode constituent materials, which are shown on the cross section of the electrode cross-sectional sample, from each other. The distribution of pores at each portion of the electrode for a secondary battery can be quantitatively analyzed by distinguishing the pores and electrode constituent materials of the electrode cross-sectional sample from each other.

It is possible to classify the cross section of the electrode cross-sectional sample produced from the electrode for a secondary battery into the upper portion, the middle portion, and the lower portion, and to quantitatively analyze the distribution of pores with precision by classifying each of the upper portion, the middle portion, and the lower portion into smaller unit regions.

Accordingly, according to an exemplary embodiment of the present invention, the distribution of the pores of the electrode for a secondary battery can be quantitatively analyzed by using a mapping image extracted by the energy-dispersive X-ray spectroscopy, thereby calculating the performance of a secondary battery including the electrode for a secondary battery in advance.

FIG. 3A is a view illustrating an EDS mapping image for pores of a negative electrode cross-sectional sample obtained by using an energy-dispersive X-ray spectroscopy (EDS) according to an exemplary embodiment of the present invention, and FIG. 3B is a view illustrating an image extracted by applying the EDS mapping image for the pores of the negative electrode cross-sectional sample to image processing.

Referring to FIG. 3A, it can be confirmed that on the EDS mapping image in which the points of silicon detected by the energy-dispersive X-ray spectroscopy are marked, the constituent materials of the negative electrode for a secondary battery expressed as a dark color and the pores expressed as a brighter color are clearly distinguished from each other. As in FIG. 3B, it is possible to classify the image of the cross section of the negative electrode cross-sectional sample extracted by the image processing into the upper, middle, and lower regions. In addition, it is possible to classify the image into a total of nine unit regions by equally dividing each region, which is classified into the upper, middle, and lower regions, into three parts in a vertical direction and to quantitatively analyze the pores of the negative electrode for a secondary battery by using the same.

According to an exemplary embodiment of the present invention, the method may further include staining the binder before the producing of the electrode cross-sectional sample. The staining of the binder may be carried out before the filling of the pores of the electrode for a secondary battery with the polymer including silicon, and may also be carried out after the filling of the pores of the electrode for a secondary battery with the polymer including silicon. Even when the electrode cross-sectional sample is observed with a scanning electron microscope, it is possible to distinguish the binder, the electrode active material, the pores, and the like from one another by staining the binder.

Accordingly, according to an exemplary embodiment of the present invention, by staining a binder included in the electrode for a secondary battery, the binder, the electrode active material, the pores, and the like can be clearly distinguished from one another, thereby more precisely analyzing the pores of the electrode for a secondary battery.

According to an exemplary embodiment of the present invention, the staining of the binder may include staining the binder with a staining material including at least one of an osmium compound and a ruthenium compound. As an example, an osmium oxide such as $OsO_4$ may be used as the osmium compound, and a ruthenium oxide such as $RuO_4$ may be used as the ruthenium compound. Specifically, when diene-based butadiene is used as a binder included in the electrode for a secondary battery and $OsO_4$ is used as a staining material, $OsO_4$ may react with and be bound to a double bond of butadiene as in the following Reaction Formula 1.

[Reaction Formula 1]

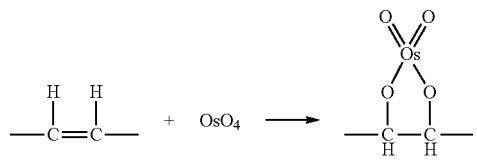

An osmium component included in the osmium compound may maximize the contrast effect caused by the difference in atomic number, thereby clearly distinguishing the binder, the pores, the electrode active material, and the like of the electrode for a secondary battery from one another.

According to an exemplary embodiment of the present invention, the method may further include: detecting a staining material in the binder by using an energy-dispersive X-ray spectroscopy; and calculating an area ratio of the binder by analyzing an image in which points of the staining material detected by the energy-dispersive X-ray spectroscopy are mapped.

Hereinafter, a case where $OsO_4$ is used as a staining material will be described in detail.

According to an exemplary embodiment of the present invention, when $OsO_4$ is used as the staining material, it is possible to detect osmium stained by staining the binder by using the energy-dispersive X-ray spectroscopy, and to extract an EDS mapping image in which points of the detected osmium are marked. Through the image in which the points of osmium are mapped, it is possible to grasp the area, position, distribution, and the like of the binder included in the electrode for a secondary battery. Accordingly, it is possible to more exactly confirm the distribution, size, number, position, and the like of pores present in the electrode for a secondary battery.

According to an exemplary embodiment of the present invention, the calculating of the area ratio of the binder by analyzing the image in which the points of the staining material detected by the energy-dispersive X-ray spectroscopy are mapped may include quantitatively analyzing an area of the binder at each portion of the electrode for a secondary battery by applying the EDS mapping image extracted by the energy-dispersive X-ray spectroscopy to image processing. Further, it is possible to classify the cross section of the electrode cross-sectional sample produced from the electrode for a secondary battery into the upper portion, the middle portion, and the lower portion, and to precisely calculate the area ratio of the binder by classifying each of the upper portion, the middle portion, and the lower portion into smaller unit regions.

FIG. 4A is a view illustrating an EDS mapping image for a binder of the negative electrode cross-sectional sample obtained by using the EDS according to an exemplary embodiment of the present invention, and FIG. 4B is a view illustrating an image extracted by applying the EDS mapping image for the binder of the negative electrode cross-sectional sample to image processing.

Referring to FIG. 4A, it can be confirmed that on the EDS mapping image in which the points of osmium detected by the energy-dispersive X-ray spectroscopy are marked, the constituent materials of the negative electrode for a secondary battery expressed as a dark color and the binder expressed as a brighter color are clearly distinguished from each other. As illustrated in FIG. 4B, it is possible to classify the image of the cross section of the negative electrode cross-sectional sample extracted by the image processing into the upper, middle, and lower regions. In addition, it is possible to classify the image into a total of nine unit regions by dividing each region, which is classified into the upper, middle, and lower regions, into three parts in a vertical direction and to quantitatively analyze the area of the binder of the negative electrode for a secondary battery by using the same.

Accordingly, according to an exemplary embodiment of the present invention, the area ratio of the binder of the electrode for a secondary battery may be quantitatively analyzed by using a mapping image extracted by the energy-dispersive X-ray spectroscopy. Accordingly, the distribution of pores of the electrode for a secondary battery can be more exactly grasped, and the performance of the electrode for a secondary battery and a secondary battery including the same can be calculated in advance.

The method for measuring a distribution of pores of an electrode for a secondary battery according to an exemplary embodiment of the present invention may be applied to a positive electrode and a negative electrode for a secondary battery.

Hereinafter, the present invention will be described in more detail through Examples. The following Examples relate to a negative electrode of the electrodes for a secondary battery, and these Examples are provided only for illustrative purposes, and are not intended to limit the scope of the present invention.

Production of Negative Electrode Cross-Sectional Sample

EXAMPLE 1

A negative electrode for a secondary battery (manufactured by LG CHEM) was prepared, and $OsO_4$ as a staining material and polydimethylsiloxane (PDMS) as a polymer including silicon were prepared. The binder of the negative electrode for a secondary battery was stained by using the prepared $OsO_4$, and pores of the negative electrode for a secondary battery were filled with the PDMS by impregnating the negative electrode for a secondary battery into the prepared PDMS. Thereafter, the surface of the negative electrode for a secondary battery was trimmed by irradiating the negative electrode for a secondary battery with focused argon (Ar) ion beam using an ion milling device (IM 4000, manufactured by Hitachi, Ltd.) irradiating an argon ion beam, thereby producing a negative electrode cross-sectional sample having a clean cross section. The irradiation with argon ion beam was carried out by setting a discharge current and an ion beam current to 400 µA and 130 µA, respectively, and was carried out at a gas flow of 1 $cm^3$/min for 3 hours.

EXAMPLE 2

A negative electrode for a secondary battery, which is the same as that in Example 1, was prepared, and a negative electrode cross-sectional sample was produced in the same manner as in Example 1, except that pores of the negative electrode for a secondary battery were filled with polydimethylsiloxane in a state where a binder of the negative electrode for a secondary battery was not stained.

COMPARATIVE EXAMPLE 1

A negative electrode for a secondary battery, which is the same as that in Example 1, was prepared, and a negative electrode cross-sectional sample was produced in the same manner as in Example 1, except that a binder of the negative electrode for a secondary battery was stained with $OsO_4$, and pores of the negative electrode for a secondary battery were filled with a polymer including epoxy.

COMPARATIVE EXAMPLE 2

A negative electrode for a secondary battery, which is the same as that in Example 1, was prepared, and a negative electrode cross-sectional sample was produced in the same manner as in Example 1, except that a binder of the negative electrode for a secondary battery was not stained, and pores of the negative electrode for a secondary battery were not filled with a polymer including silicon.

COMPARATIVE EXAMPLE 3

A negative electrode for a secondary battery, which is the same as that in Example 1, was prepared, and a negative electrode cross-sectional sample was produced in the same manner as in Example 1, except that a binder of the negative electrode for a secondary battery was not stained, and pores of the negative electrode for a secondary battery were filled with a polymer including epoxy.

SEM Photograph Analysis of Negative Electrode for Secondary Battery

The negative electrode cross-sectional samples produced in Examples 1 and 2 and Comparative Examples 1 to 3 of the present invention were observed with a scanning electron microscope (SU8020, manufactured by Hitachi, Ltd.), and the SEM photographs thereof were captured.

FIG. 5A is a scanning electron microscope (SEM) photograph of the negative electrode cross-sectional sample produced in Example 1, FIG. 5B is a SEM photograph of the negative electrode cross-sectional sample produced in Example 2, FIG. 5C is a SEM photograph of the negative electrode cross-sectional sample produced in Comparative Example 1, FIG. 5D is a SEM photograph of the negative electrode cross-sectional sample produced in Comparative Example 2, and FIG. 5E is a SEM photograph of the negative electrode cross-sectional sample produced in Comparative Example 3.

Referring to FIGS. 5A and 5B, it was confirmed that the negative electrode constituent materials for a secondary battery, such as an active material present on different focal planes at the bottom of the pore, were not observed because the pores of the negative electrodes for a secondary battery according to Examples 1 and 2 were impregnated into the PDMS, and as a result, the negative electrode constituent materials for a secondary battery and pores were clearly distinguished from each other. Furthermore, referring to FIG. 5A, it could be seen that in the case of Example 1 in which the binder of the negative electrode for a secondary battery was stained by using $OsO_4$, the negative electrode constituent materials for a secondary battery, the binder, and the pores were clearly distinguished from one another, and as a result, the pores could be more exactly confirmed.

In contrast, referring to FIG. 5D, it was confirmed that in the case of Comparative Example 2 in which the pores of the negative electrode for a secondary battery were not impregnated with a polymer including silicon, the negative electrode constituent materials for a secondary battery, such as an active material present on different focal planes at the bottom of the pore, were together observed by a deep focal depth of a scanning electron microscope, and as a result, it was difficult to distinguish the negative electrode constituent materials for a secondary battery and the pores from each other. Further, it was confirmed that in the case of Comparative Example 2, the binder was not stained, and as a result, it was difficult to distinguish the negative electrode constituent materials, the pores, and the binder from one another.

Referring to FIGS. 5C and 5E, it could be confirmed that in the case of Comparative Examples 1 and 3 in which the pores of the negative electrode for a secondary battery were filled with a polymer including epoxy, the pores and the negative electrode active material were not easily distinguished from each other, as compared to Examples 1 and 2 in which the pores were impregnated into the PDMS. Furthermore, by the difference, it can be seen that when the SEM photographs of Examples 1 and 2 and Comparative Examples 1 and 3 are applied to image processing, the pores and the negative electrode active material can be more clearly distinguished from each other as compared to Examples 1 and 2.

Accordingly, according to an exemplary embodiment of the present invention, it is possible to clearly distinguish pores and negative electrode constituent materials from each other by filling the pores of the electrode for a secondary battery with a polymer including silicon, and to clearly distinguish a binder of the electrode for a secondary battery by staining the binder, thereby more precisely confirming the pores of the electrode for a secondary battery.

Analysis of Pores of Negative Electrode for Secondary Battery

From the negative electrode cross-sectional sample produced in Example 1, silicon components of the PDMS filling the pores of the negative electrode for a secondary battery were detected and osmium components of an $OsO_4$ staining material staining the binder of the negative electrode for a secondary battery were detected, by using an energy-dispersive X-ray spectroscopy attached to a scanning electron microscope (SU8020, manufactured by Hitachi, Ltd.). Thereafter, EDS mapping images in which points of the detected silicon and osmium were marked were extracted. Thereafter, images for quantitatively analyzing pores were extracted by applying the extracted EDS mapping images to image processing. In this case, as the energy-dispersive X-ray spectroscopy, an energy-dispersive X-ray spectroscopy having an energy resolution of 5.9 keV or more and 136 keV or less and a minimum detection limit of 0.1 wt % was used.

From the negative electrode cross-sectional sample produced in Example 2, silicon components of the PDMS filling the pores of the negative electrode for a secondary battery were detected and an EDS mapping image in which points of the detected silicon were marked was extracted, by using the energy-dispersive X-ray spectroscopy. Thereafter, an image for quantitatively analyzing pores was extracted by applying the extracted EDS mapping image to image processing.

FIG. 6A is a set of views illustrating the EDS mapping images of the negative electrode cross-sectional samples according to Examples 1 and 2 obtained by using the EDS, and FIG. 6B illustrates images extracted by applying the EDS mapping images for the negative electrode cross-sectional samples according to Examples 1 and 2 to image processing.

Referring to FIG. 6A, it could be confirmed that in the case of Example 1, the pores, the negative electrode active material, and the binder were clearly distinguished from one another on the negative electrode cross-sectional sample, and it was confirmed that in the case of Example 2, the binder was not stained, and as a result, only the pores and the negative electrode active material could be distinguished from each other. Furthermore, as illustrated in FIG. 6B, the images of the cross section of the negative electrode cross-sectional sample extracted by the image processing can be classified into the upper, middle, and lower regions, and the image was classified into a total of nine unit regions by dividing each region, which was classified into the upper, middle, and lower regions, into three parts in a vertical direction, thereby quantitatively analyzing pores of a negative electrode for a secondary battery.

The following Table 1 describes a porosity exhibiting the distribution of pores present in each area of the 9 unit regions of the negative electrode for a secondary battery produced in Example 1 and the ratio of the negative electrode active material and the binder region, and the following Table 2 describes the porosity of each area of the 9 unit regions of the negative electrode for a secondary battery produced in Example 2.

TABLE 1

| Region | Upper | | | Middle | | | Lower | | | |
|---|---|---|---|---|---|---|---|---|---|---|
| Unit region | 1 | 2 | 3 | 4 | 5 | 6 | 7 | 8 | 9 | Average |
| Negative electrode active material (%) | 65.1 | 59.6 | 57.2 | 61.0 | 58.7 | 60.3 | 59.8 | 54.4 | 57.4 | 59.3 |
| Binder (%) | 0.7 | 2.1 | 2.0 | 2.5 | 1.7 | 3.1 | 1.1 | 1.4 | 1.3 | 1.8 |
| Porosity (%) | 34.2 | 38.3 | 40.8 | 36.5 | 39.6 | 36.6 | 39.1 | 44.2 | 41.3 | 38.9 |

TABLE 2

| Region | Upper | | | Middle | | | Lower | | | |
|---|---|---|---|---|---|---|---|---|---|---|
| Unit region | 1 | 2 | 3 | 4 | 5 | 6 | 7 | 8 | 9 | Average |
| Negative electrode active material (%) | 65.7 | 58.8 | 56.4 | 61.3 | 57.3 | 60.7 | 60.8 | 54.6 | 57.2 | 59.2 |
| Porosity (%) | 34.3 | 41.2 | 43.6 | 38.7 | 42.7 | 39.3 | 39.2 | 45.4 | 42.8 | 40.8 |

Referring to Tables 1 and 2, it could be seen that the distribution of pores of the negative electrode for a secondary battery could be more exactly confirmed in Example 1 in which the pores were impregnated into the PDMS and the binder was stained with OSO$_4$, as compared to Example 2 in which the binder was not stained. Specifically, it could be confirmed that in the case of Example 1 in which the binder was stained, the pores and the negative electrode active material were distinguished from the binder, and as a result, the porosity in a unit region was smaller than that in Example 2, and accordingly, it could be seen that the porosity of the negative electrode for a secondary battery could be more exactly confirmed.

Accordingly, according to an exemplary embodiment of the present invention, it is possible to quantitatively analyze the pores, the active material, and the binder present in the electrode for a secondary battery, thereby predicting the performance of a secondary battery in which an electrode for a secondary battery is used.

What is claimed is:

1. A method for measuring a distribution of pores in an electrode for a secondary battery, comprising:
    preparing an electrode for a secondary battery comprising an electrode active material, a binder, and a conductive material;
    filling pores inside the electrode for a secondary battery with a polymer comprising silicon by impregnating the polymer comprising silicon into the electrode for a secondary battery;
    producing an electrode cross-sectional sample by irradiating the electrode for a secondary battery with an ion beam of an ion milling device;
    detecting silicon present on the electrode cross-sectional sample by using an energy-dispersive X-ray spectroscopy; and
    confirming a distribution of pores by analyzing an image in which points of silicon detected by the energy-dispersive X-ray spectroscopy are mapped.

2. The method of claim 1, wherein the polymer comprising silicon comprises one or more selected from the group consisting of polydimethylsiloxane, polysiloxane, polysilane, and polysilazane.

3. The method of claim 1, further comprising:
    staining the binder, before the producing of the electrode cross-sectional sample.

4. The method of claim 3, wherein the staining of the binder comprises staining the binder with a staining material comprising at least one of an osmium compound and a ruthenium compound.

5. The method of claim 4, further comprising:
    detecting the staining material in the binder by using an energy-dispersive X-ray spectroscopy; and
    calculating an area ratio of the binder by analyzing an image in which points of the staining material detected by the energy-dispersive X-ray spectroscopy are mapped.

6. The method of claim 1, wherein the ion beam is an argon ion beam.

7. The method of claim 1, wherein an ion beam current of the ion milling device is from 100 μA to 250 μA.

8. The method of claim 1, wherein a discharge current of the ion milling device is from 250 μA to 450 μA.

* * * * *